United States Patent [19]

Woods

[11] Patent Number: 4,599,018

[45] Date of Patent: Jul. 8, 1986

[54] AUTOMATIC TRAVERSING DRILLING UNIT AND METHOD OF USING

[75] Inventor: Quentin T. Woods, Redmond, Wash.

[73] Assignee: The Boeing Company, Seattle, Wash.

[21] Appl. No.: 772,297

[22] PCT Filed: Feb. 13, 1984

[86] PCT No.: PCT/US84/00225

§ 371 Date: Feb. 13, 1984

§ 102(e) Date: Feb. 13, 1984

[87] PCT Pub. No.: WO85/03466

PCT Pub. Date: Aug. 15, 1985

[51] Int. Cl.⁴ .................. B23B 35/00; B23B 39/14
[52] U.S. Cl. ................................. 408/1 R; 408/76; 408/98; 409/178; 409/180
[58] Field of Search .............. 408/1 R, 76, 77, 78, 408/98, 237; 409/175, 178, 179, 180

[56] References Cited

U.S. PATENT DOCUMENTS

| | | | |
|---|---|---|---|
| 2,871,730 | 2/1959 | Gremp | 408/77 |
| 3,706,505 | 12/1972 | Stoutguard | 408/78 |
| 4,268,196 | 5/1981 | Harrow | 409/180 |

*Primary Examiner*—John Sipos
*Attorney, Agent, or Firm*—M. A. Case; B. A. Donahue

[57] ABSTRACT

A pair of support members and a pair of drilling units are mounted for reciprocal movement along a carriage. The support members secure to latch bolts on an elongated surface to be drilled. The drill units move along the carriage in both an X and Y direction to automatically drill holes in the surface. The drill units are then secured to latch bolts and the carriage with support members advanced on rollers located in the support members. The support members are secured to the next latch bolts and the process continued until holes are drilled throughout the length of the surface to be drilled.

16 Claims, 14 Drawing Figures

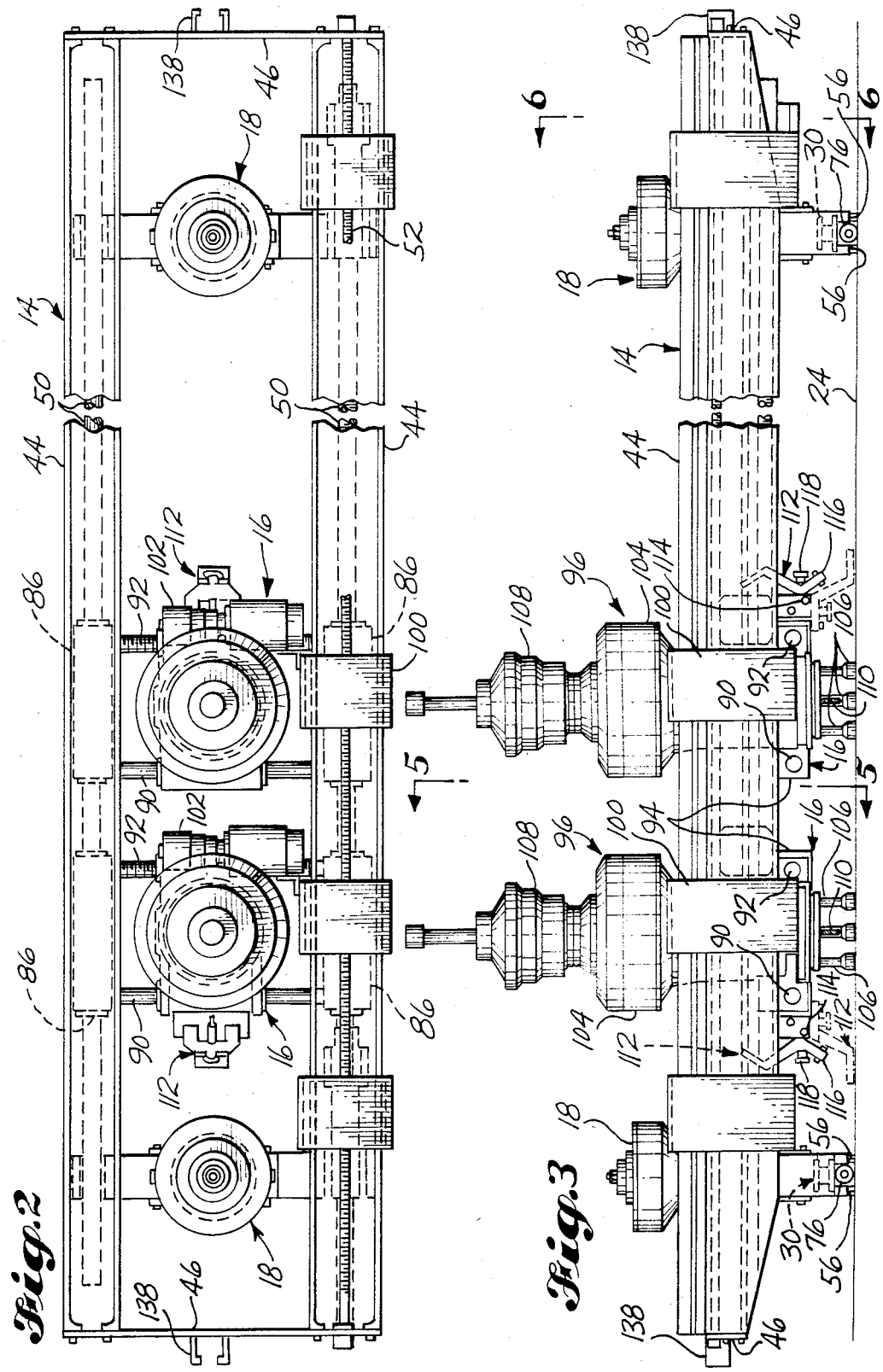

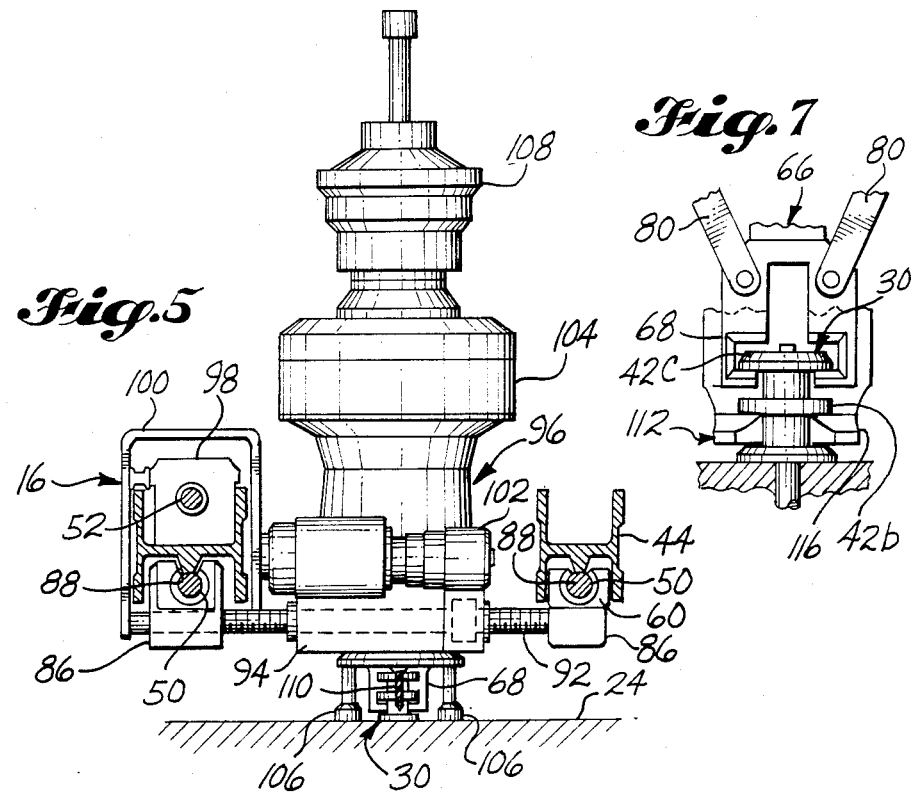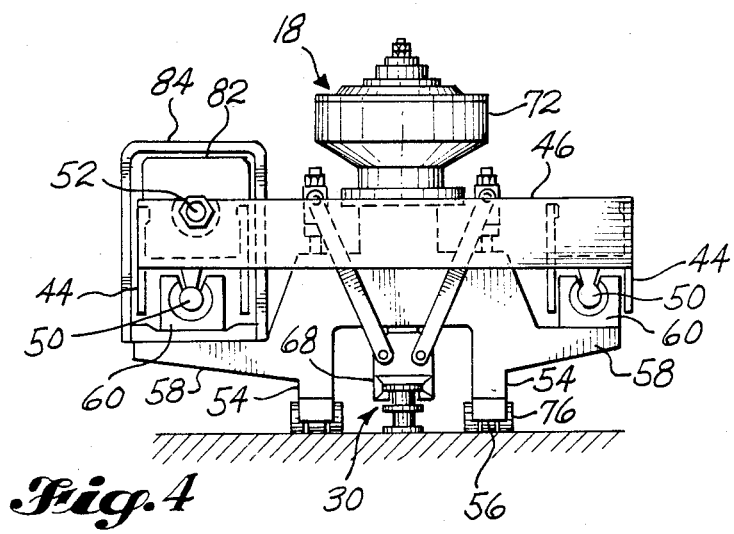

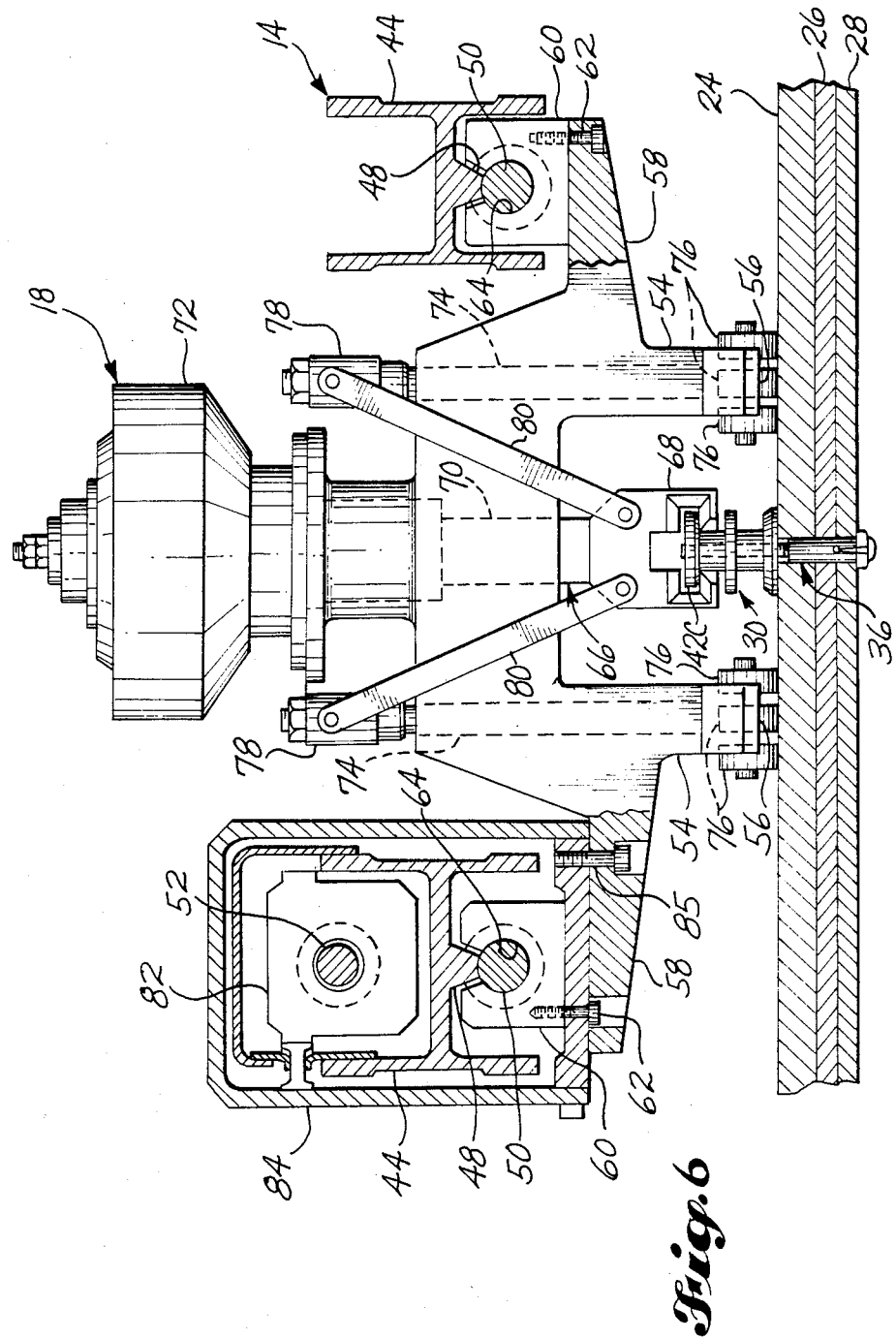

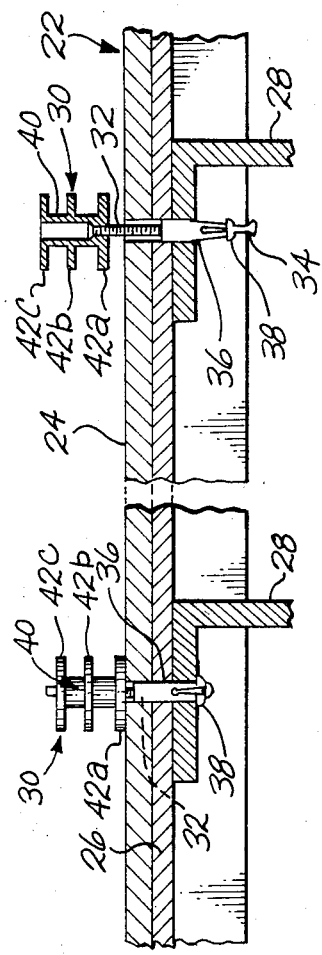
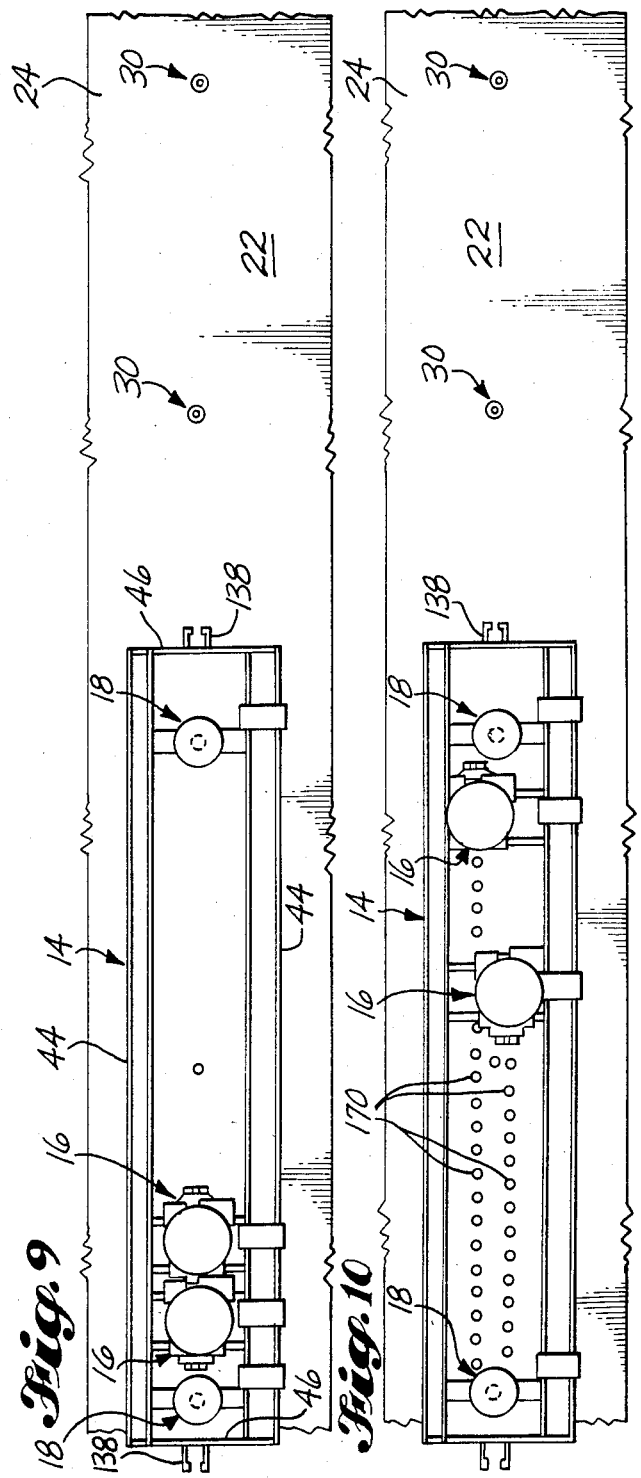

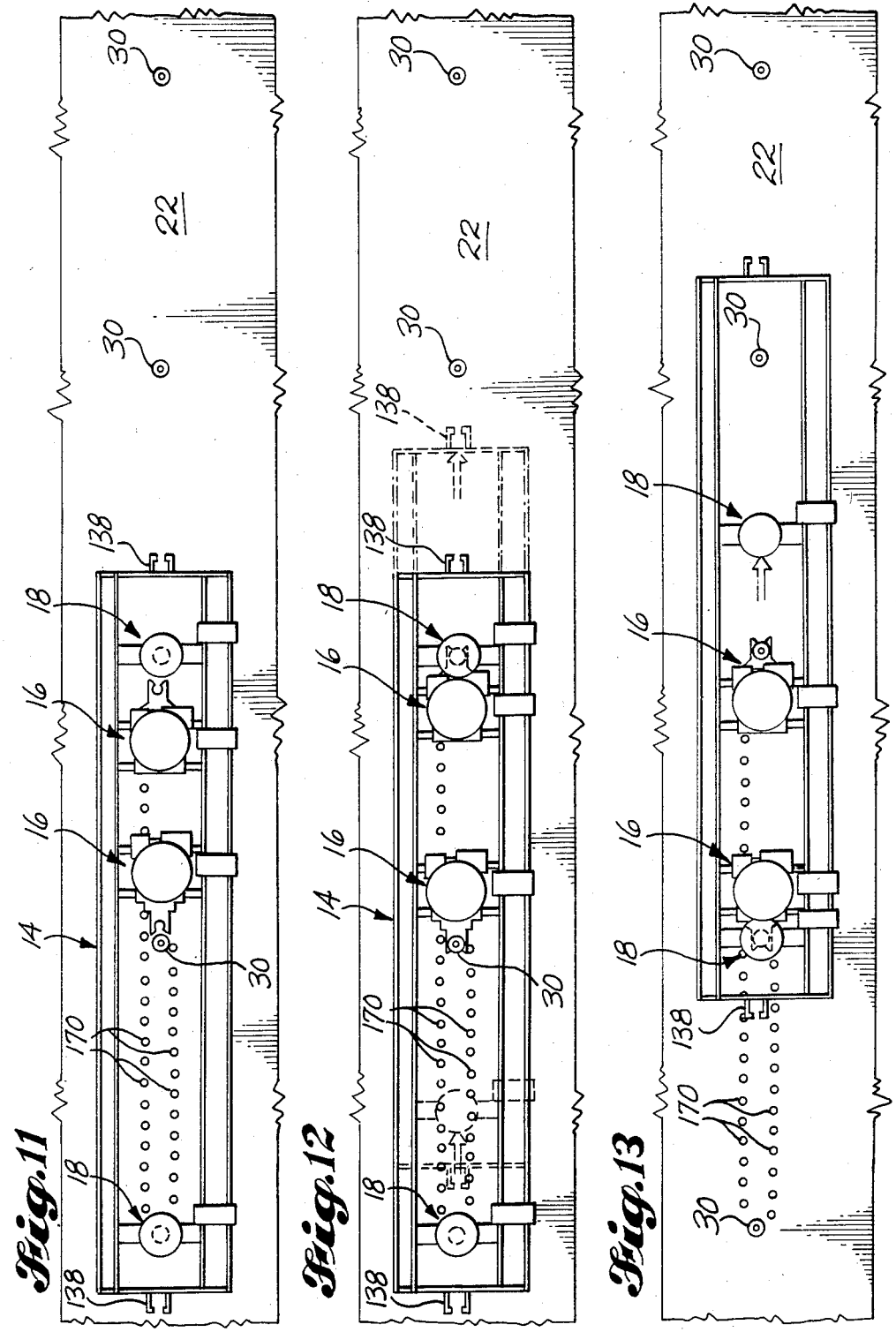

AUTOMATIC TRAVERSING DRILLING UNIT AND METHOD OF USING

BACKGROUND OF THE INVENTION

Drilling a long series of holes to secure body panels and wing panels to substructures such as stringers, spar chords and other stiffeners in airframe manufacture is a common and repetitive operation. The spacing accuracy of such holes in load bearing structures is sufficiently critical to require templates to maintain hole spacing, pitch and end margin control. Further, countersinking is required to maintain flushness for fasteners protruding into the slip stream. In view of the large number of stringers, spar chords, and stiffeners employed in monocoque aircraft structures, there is an incentive to automate this common manufacturing task. Of particular interest is that of assemblying completed body panels and wing panels to their underlying skeletel structures where hand held drill motors are used for drilling and countersinking as two successive operations.

SUMMARY OF THE INVENTION

A pair of drilling units are each mounted for movement in an X and a Y direction to a frame or carriage. The carriage is mounted to a pair of support members, with each support member adjustable between extending pressure feet and extending rollers to contact a surface, and each support member having a latch mechanism to attach to and release from latch bolts mounted along the surface. The drilling units also each have a latch mechanism to attach to and release from the mounted latch bolts.

DESCRIPTION OF THE DRAWINGS

FIGS. 2, 3 and 4 show a plan view, a side elevational view, and an end view of the traversing part of this invention.

FIG. 5 shows a cross sectional view taken along line 5—5 of FIG. 3.

FIG. 6 shows a blown up cross sectional view taken along line 6—6 of FIG. 3.

FIG. 7 shows a blown up fragmented view as in FIG. 6 with a drill latch of this invention superimposed.

FIG. 8 shows a cross sectional side elevational view of latch bolt placement to a surface to be drilled, for holding the traversing part of this invention.

FIGS. 9 through 13 show plan views illustrating steps in operating this invention.

DETAILED DESCRIPTION

Figure 1:
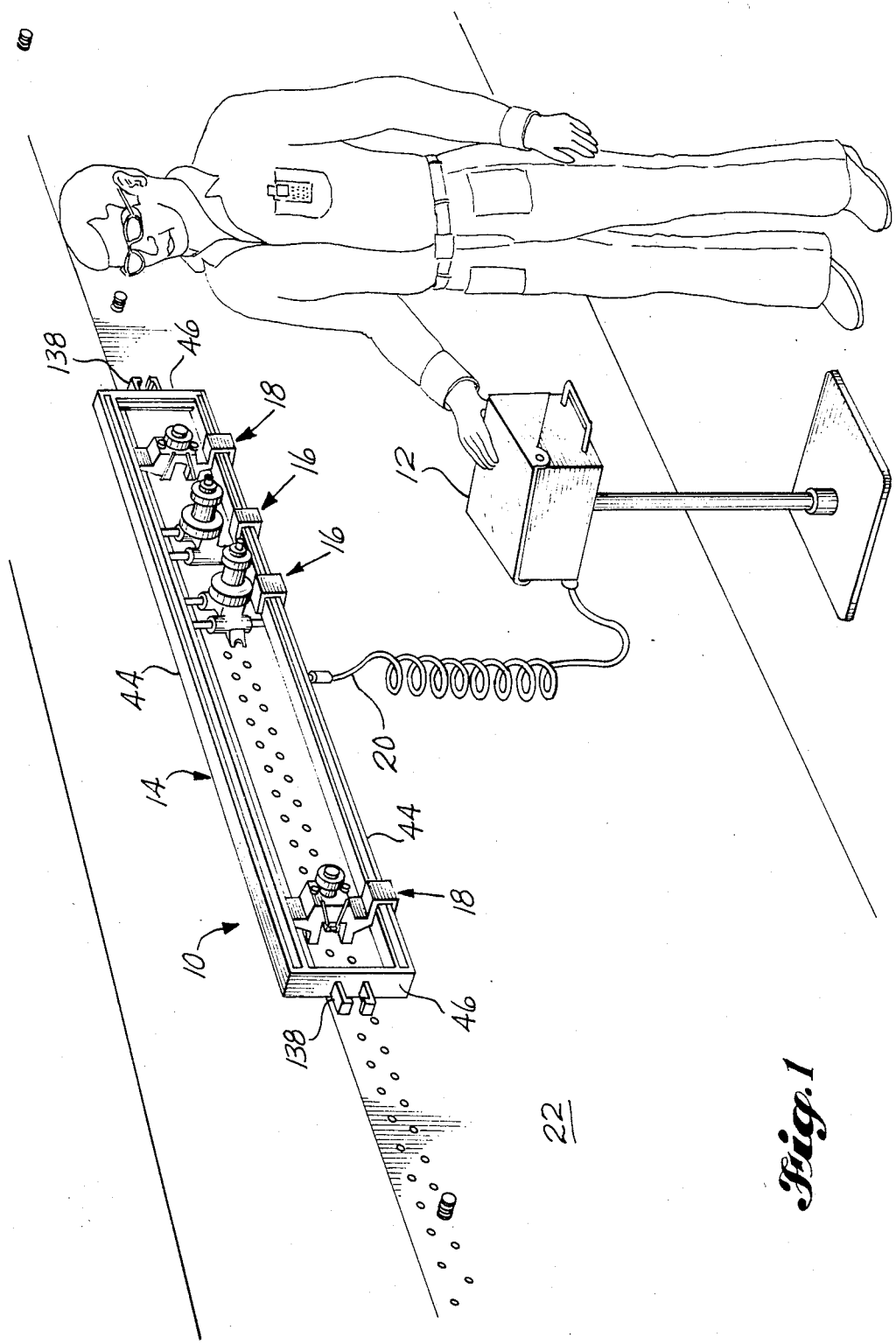
FIG. 1 shows a perspective view of the traversing drilling unit of this invention in use.

A traversing drilling unit 10, has a control cabinet 12, a carriage 14 upon which is mounted a pair of drilling units 16, and a pair of support members 18, and an interconnecting control line 20.

This unit, is for mounting to and drilling holes along an elongated surface. It is especially useful in drilling various outside skin panels such as body panels and wing panels. The following description and illustrations relate to, but do not limit, its application to an airplane wing 22. An airplane wing as shown in FIG. 8 has a skin 24, lengthwise extending spars and or stringers shown as 26, and laterally extending ribs 28. A series of lock bolts 30 are aligned along the wing and are located at each rib. The lock bolt is preferably as shown with a bolt 32 having a head tapered on the inside at 34, a sleeve 36 formed on one end at 38 to allow insertion into a hole and to be expanded out by the tapered bolt head to lock the bolt in place, and a bobbin 40 with tripple flanges 42a, 42b and 42c. This lock bolt may be inserted, locked, unlocked and removed all from one side. The preferred lock bolt as described above, grips the stack of parts between two opposed compression faces so the compressive gripping forces are distributed over a large area. Other clamp up collets that expand within the hole will distort the hole through point loading. Such devices are not suitable for soft aluminum, composite or fiber reinforced plastic skin structures.

The carriage 14 is made up with a pair of spaced apart parallel H shaped members 44, joined together at each end with plates 46. Each of these members has a downward extending projection or rib 48 shaped to contact and to support a shaft 50 that extends along the length of the H shaped member. These shafts are aligned to be parallel to each other. A threaded bar 52 is located above and parallel to one of the shafts. It is secured at each end to plates 46 in a manner to keep the bar in tension.

Support members 18, as best shown in FIG. 6, each have a pair of downwardly extending legs 54 that terminate in pressure foot surfaces 56. They also have a pair of outwardly extending arms 58 that are used to support the carriage 14. To accomplish this each arm has a block 60 secured by at least one bolt 62 to the top surface of the arm. Each block has an opening 64 sized to accept a carriage shaft 50 in a manner to permit reciprocal movement of the support member along the shafts. A rod 66 is vertically mounted for reciprocal movement in the middle of the support member. The rod has a clamp 68 on one end and is threaded at 70 throughout much of its length. The clamp is shaped to move over a bobbin 30 and to work against bobbin flange 42c. A clamp up nut runner electric motor 72 is located to work against the threaded part of the rod to move the rod back and forth with respect to the rest of the support member. A pair of reciprocally mounted bars 74 are mounted in the legs parallel to the rod. A set of rollers 76 are located at the lower end of each bar and a head 78 is located at the top. A rigid strap 80 extends from the head to the clamp end of the rod.

A nut runner electric motor 82 is mounted to housing 84 which in turn is mounted by bolt 62 and 85 to the support member. This motor works against threaded bar 52 to move the support member with respect to the carriage.

The drilling units 16 are mounted to the carriage 14, in a manner to permit the drilling units to move in an X and a Y direction. These units are joined to the carriage by use of a pair of elongated blocks 86. Each of these blocks have a lengthwise extending slot 88 shaped to fit over and to permit the block to reciprocally move along a carriage shaft 50. A pair of parallel rods 90 and 92 extend between and are joined to the blocks with rod 92 threaded. A drill frame 94, to support the drill 96 is mounted to reciprocally move along the pair of rods. A nut runner motor 98 with housing 100 is mounted to one of the elongated blocks, and is located to work with threaded bar 52 to move the traversing drilling unit 16 with respect to the carriage 14. A second nut runner motor 102 is mounted to the drill frame and is located to work with threaded bar 92 to laterally move the frame with drill. These two nut runner motors permit the drill to be moved in an X and in a Y direction. The drill also has a nut runner motor 104 which moves the drill vertically with respect to the drill frame. When the drill is moved down pressure feet 106 are pressed against the surface 24 and presses together the parts to be drilled. A nut runner motor 108 is used to control the actual drilling by the twist drill 110 which may be shaped to provide simultaneous countersinking.

Each drilling unit 16 has a latching mechanism 112 with one of the units having the mechanism located on one side, and the second unit having the mechanism located on the other side. The latching mechanism is mounted to the drill frame 94 and is pivotally mounted at 114 to that frame. The mechanism includes a shaped tapered fork unit 116 that works in conjunction with flange 42b of the bobbin 30 to secure the traversing drilling unit to the bobbin. This mechanism as is best shown in FIG. 3 moves between the latching position and the raised position. This is accomplished by loosening the bolt head 118 moving the shaped unit to the new position and tightening the bolt head.

Figure 14:
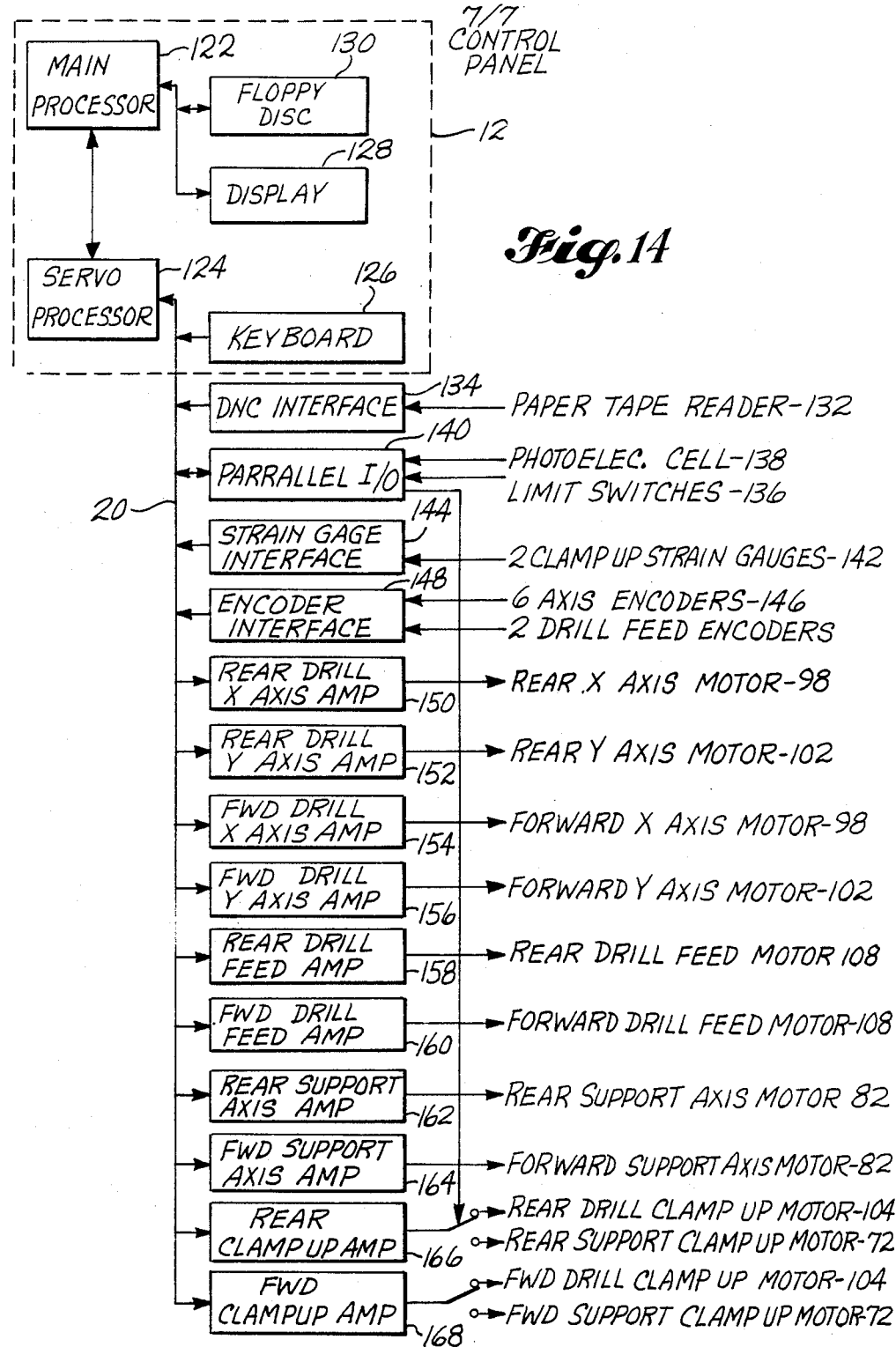
FIG. 14 shows a block diagram of the controls for this invention.

The control units for operating the traversing drilling unit 10 are shown in the block diagram of FIG. 14. The control panel for cabinet 12 has a main processor 122, a servo processor 124, a keyboard 126, a display 128 and a place for accepting a floppy disc 130. The unit may be controlled by the floppy disc, by the keyboard or by a paper tape reader 132 acting through a distributive numerical control interface 134. Limit switches 136 and independently photoelectric cells 138 act through parallel input output units 140 to act through line 20 and tie to the control panel. Clamp up strain gauges 142 act through strain gauge interface 144, and a series of encoders 146 act through encoder interface 148 and a series of amplifiers 150 through 168 are used to control various motors.

In operation the traversing drilling unit carriage 14 is secured to a surface such as but not limited to an airplane wing 22 to be drilled, and the unit advanced in steps. This is illustrated in FIGS. 9 through 13. A series of lock bolts 30 are secured in alignment along the length of and at each rib 28 of wing 22. The support members 18 are then secured to a first and third latch bolt, the pressure feet 56 brought down against the wing surface, and the intermediate latch bolt removed. The programmed drilling units 16 then drill holes 170. During the drilling, the drill unit is automatically moved over the hole location, the pressure feet pressed down against the wing surface with a pressure as required to ensure parts of the wing are all contacting each other, the parts drilled, the pressure feet raised and the unit moved to the next location. All the required holes are drilled beyond the location for the intermediate latch bolt. The pressure feet of the support members are raised, the rollers 76 remain in contact with the wing, and the members remain secured to the latch bolts. The intermediate latch bolt is replaced. The drill latching mechanism 112 are lowered, the rear drill unit attached to the intermediate latch bolt, the forward drill unit attached to the next latch bolt, and the pressure feet 106 of both drill units lowered to lock the drill units to the wing. The X axis drill unit motors 98 are turned on which moves the carriage and support members forward until the rear support member is directly over and is locked to the intermediate latch bolt as is shown in FIG. 13. The forward support member is then advanced and joined to the next latch bolt after which the drill units are released from the latch bolts, the drill units latch mechanisms raised, the support members pressure feet lowered against the wing surface and the process repeated until the wing is drilled throughout its length. While the carriage is advancing the photoelectric cell 138 signals the distance between adjacent latch bolts. This information is stored in the processor 122. Should this distance be out of tolerance the unit will shut down and the fact as to why shown on the display 128. If the distance is within tolerance the unit will automatically evenly drill the specified number of holes between the adjacent latch bolts.

I claim:

1. A traversing unit for incrementally moving along and drilling an elongated surface comprising: a carriage, means for mounting the carriage to an elongated surface to be drilled, drilling means movably mounted to the carriage and having means for selectively drilling within the boundary of the carriage, and means for advancing the carriage in steps for repeatedly advancing then drilling along the length of the elongated surface; wherein the means for mounting the carriage to an elongated surface comprise: a series a clamp up bolts spaced along the elongated surface, a first latch mechanism having means for grasping a clamp up bolt for securing the mechanism to the elongated surface and the mechanism having means for supporting part of the carriage, a second latch mechanism having means for grasping a second clamp up bolt for securing the second mechanism to the elongated surface and that mechanism having means in combination with the first latch mechanism for completely supporting the carriage; wherein the means for advancing the carriage comprises: means for attaching the drilling means to clamp up bolts, means for releasing the latch mechanisms from the clamp up bolts, means for introducing rollers between the latch mechanisms and the elongated surface, and means for advancing the carriage with respect to the drilling means attached to the clamp up bolts.

2. A traversing unit for incrementally moving along and drilling an elongated surface comprising: a pair of spaced apart support members, a first latch member extending between and attached adjacent an end of the pair of support members, a second latch member extending between and attached adjacent an opposite end of the pair of support members, means for securing each of the latch members to an elongated wing surface to be drilled, a pair of drilling units with each unit mounted between and secured to the support members in a manner to permit reciprocal motion of the drilling units parallel to and normal to the support members to position the units for drilling, means mounted on each drilling unit for securing the drilling units to said elongated surface and means for advancing the support members over the elongated surface while said drill units are secured to said surface to permit drilling along the length of that surface.

3. A traversing unit for incrementally moving along and drilling an elongated surface as in claim 2 further comprising: means for automatically drilling then advancing the support member.

4. A traversing unit for incrementally moving along and drilling an elongated surface as in claim 3, further comprising: the means for securing to the elongated surface includes a series of aligned spaced apart clamp up bolts extending along the length of the elongated surface; a catch on each latch member for securing to the bolt; and means for measuring the distance between clamp up bolts, comparing that distance against tolerance distance, and automatically drilling with a uniform distance between each hole throughout the distance between clamp up bolts.

5. A traversing drilling unit for securing to, drilling, and advancing along an elongated surface to be drilled, with the unit comprising: a pair of spaced apart parallel support members; a pair of drilling units mounted to the support members in a manner to permit reciprocal movement of each of the drilling units in a direction parallel to and normal to the support members for positioning the units for drilling holes in an elongated surface; the drilling units each, having means for securing to that surface and means for advancing the support members while so secured; and a pair of latch members each having means for holding the support members, means for securing the latch and support members to the elongated surface during drilling, means for releasing from the surface, and means for positioning rollers for use when the support and latch members are advanced.

6. A traversing drilling unit for securing to, drilling, and advancing along an elongated surface to be drilled as in claim 5 wherein the means for securing to the elongated surface includes a series of aligned spaced apart clamp up bolts positioned along the elongated surface, and each bolt having a bobbin shaped projection to be used for securing the drill units and the latch members to the elongated surface.

7. A traversing drilling unit for securing to, drilling, and advancing along an elongated surface to be drilled as in claim 6, further comprising: at least one of the latch members secured to the spaced apart support members in a manner to permit longitudinal reciprocal movement of the latch member with respect to the support members.

8. A traversing drilling unit for securing to, drilling and advancing along an elongated surface to be drilled as in claim 6, further comprising: means for measuring and storing distance between adjacent clamp up bolts for use during drilling between those bolts; and means for comparing stored versus tolerance distances, for displaying an out of tolerance condition, and for apportioning drilled hole distance for in tolerance distances.

9. A traversing drilling unit for securing to, drilling, and advancing along an elongated surface to be drilled as in claim 8, further comprising: the drill units each having means for automatically locating and drilling the holes.

10. A traversing drilling unit for securing to, drilling, and advancing along an elongated surface to be drilled as in claim 9, further comprising: a second one of the latch members secured to the spaced apart members in a manner to permit longitudinal reciprocal movement of the latch member with respect to the supporting members.

11. A traversing drilling unit for securing to, drilling, and advancing along an elongated surface to be drilled comprising: a pair of spaced apart elongated support members each having a lengthwise extending joined rod with the rods parallel to each other and one of the support members having a mounted threaded bar longitudinally extending parallel to the rods; a pair of latch members each extending between and slideably joined adjacent each end to the rods, each latch member having a hollow motor mounted to work against the threaded bar to move the latch member along the rods, a catch for securing to a latch bolt in an elongated surface to be drilled, a pair of pressure feet, a pair of rollers and a second hollow nut motor mounted to actuate the catch and to move the latch member between the pressure feet down and the rollers down position; a pair of drill carriages each extending between and slideably joined to the support member mounted rods; and the drill carriages each having a drilling unit, a hollow nut motor mounted to work against the longitudinally extending threaded bar to move the carriage along the support member, a hollow nut motor mounted to work against a laterally aligned threaded bar to move the carriage laterally between support members, and a tapered fork mounted on each drill carriage for securing the carriage to a latch bolt on the elongated surface to in combination provide a traversing unit for repeated drilling and advancing of the unit by the drill motor connected to the longitudinal threaded bar relative said secured drill carriages.

12. A traversing drilling unit for securing to, drilling, and advancing along an elongated surface to be drilled as in claim 11, and further comprising: means for pressing a positioned drilling unit against the elongated surface to clamp parts together during drilling.

13. A traversing drilling unit for securing to, drilling, and advancing along an elongated surface to be drilled as in claim 11, further comprising: means for automatically controlling the traversing unit.

14. A method of drilling along the length of an elongated surface, with steps comprising: securing a series of aligned spaced apart clamp up bolts along an aircraft wing surface to be drilled, holding a drill carriage frame against the elongated surface by securing frame latch members against two of the alternate clamp up bolts, removing the intermediate clamp up bolt, moving a pair of drills mounted for X and Y movement along the frame and drilling the required holes through the elongated surface to a point at least beyond the intermediate clamp up bolt hole, replacing the intermediate clamp up bolt, positioning latch member mounted rollers against the elongated surface, moving the drills along the frame and securing the first drill to the intermediate and the second drill to the next clamp up bolt, releasing the latch members from the clamp up bolts, moving the frame forward with respect to the fastened drills until the rear latch is over the intermediate clamp up bolt, securing the rear latch member to that bolt and securing the leading latch member to the next alternate clamp up bolt, releasing the drills from the bolts, removing the new intermediate bolt, and drilling along the length of the elongated surface by continuously repeating the process.

15. A method of drilling along the length of an elongated surface as in claim 14, with further steps comprising: automatically controlling the sequence of operation.

16. A method of drilling along the length of an elongated surface in claim 15, with further steps comprising: automatically measuring the distance between clamp up bolt locations, comparing the measured distance with specification distances, displaying the fact and shutting down operations when the distance is out of tolerance and apportioning distance between holes to be drilled when the distance is within tolerance.

* * * * *